April 3, 1945.  R. O. WHITESELL  2,372,698
RECTIFIER BATTERY CHARGER CIRCUIT
Filed July 20, 1943
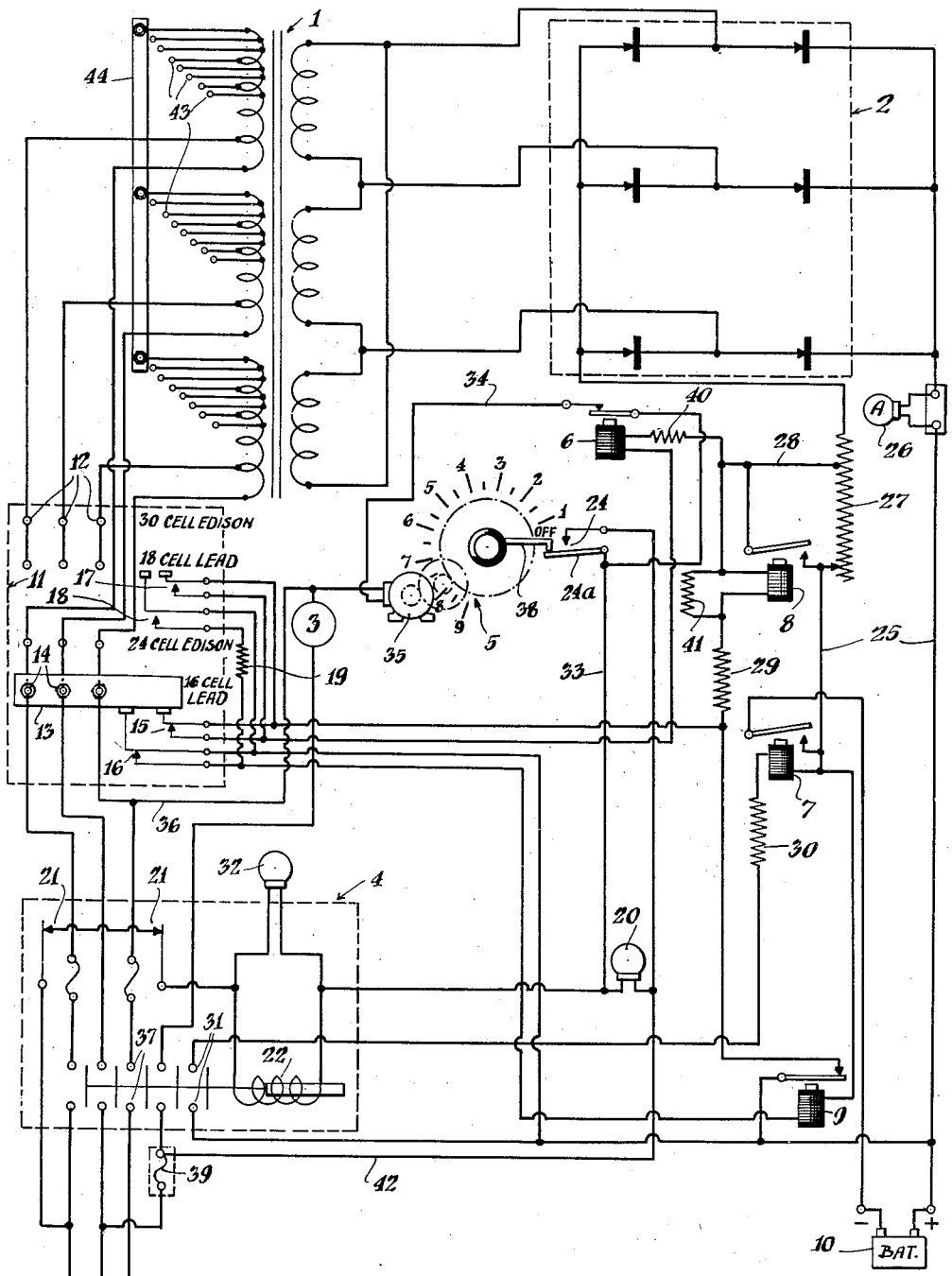
INVENTOR.
Robert O. Whitesell
BY
Robbin & Carlson
ATTORNEYS Patented Apr. 3, 1945

2,372,698

UNITED STATES PATENT OFFICE 2,372,698

RECTIFIER BATTERY CHARGER CIRCUIT

Robert O. Whitesell, Indianapolis, Ind., assignor to P. R. Mallory & Co., Inc., Indianapolis, Ind., a corporation of Delaware Application July 20, 1943, Serial No. 495,427

2 Claims. (Cl. 320—33)

This invention relates to rectifier circuits for charging storage batteries from an A. C. source.

An object of the invention is to improve battery charger circuits.

Another object is to provide an automatic charger capable of charging a large percentage of battery types and sizes as now used in most electric trucks.

A further object is to provide an automatic charger which is adjustable for charging different types and sizes of batteries in the recommended manner by making one simple adjustment.

A still further object is to provide an automatic charger which automatically resumes charging when power is returned to the mains after an interruption and which has signal lights for indicating when the charging circuit is on and when the charging circuit is off.

Other objects of the invention will be apparent from the description and claims.

In the drawing:

The figure is a circuit diagram of a battery charging circuit suitable for charging both lead and nickel-alkaline batteries of various voltages.

The present invention contemplates a battery charger of universal application which can be readily connected for charging either lead or nickel-alkaline batteries of different voltage ratings. Due to differences in their construction and mode of operation lead batteries and nickel-alkaline batteries, such as the Edison battery, require different methods of charging. The lead batteries require a high initial charging rate approximately equal to 25 amp. for each 100 ampere-hours of battery capacity and a finish rate of approximately 5 amp. for each 100 hours of capacity. The Edison or nickel-alkaline batteries on the other hand require a relatively high charging rate of constant value throughout the charging period. The circuit of the present invention is readily adapted to the charging of both types of batteries.

Referring to the drawing a charging circuit is illustrated which, by way of example, may be adapted for charging 16 cell lead batteries, 18 cell lead batteries, 24 cell Edison batteries and 30 cell Edison batteries.

In general the system comprises a 3-phase transformer 1 which supplies alternating current to a full wave rectifier bridge 2 which rectifies the current for charging a battery 10. A magnetic contactor or circuit breaker 4 is arranged to connect transformer 1 to the 3-phase A. C. line. A battery selector panel 11 is provided for setting the circuit connections for charging the various types of batteries. A time switch 5 is provided for timing the entire charging period of Edison type batteries or the finish rate period for the lead batteries. Timer 5 is under control of a timer control relay 6.

Another relay 7 is provided to disconnect the battery from the charging circuit whenever the D. C. supply fails or is turned off. The charger will automatically restart after a temporary shutdown.

A finish rate relay 8 is provided to insert a resistance in the charging circuit for the finish rate period of lead batteries. Finish rate relay 8 and timer control relay 6 are under control of a temperature compensated voltage relay 9 which is connected across the rectifier output conductors when lead batteries are being charged.

A fan motor 3 is connected whenever the circuit is in operation to circulate cooling air over the rectifier and transformer.

Further details of the circuit will become evident from the following description of its operation. The circuit is shown in the idle condition with the battery selector panel 11 set for charging a 16-cell lead battery. Panel 11 comprises 4 sets of jacks 12, the lower two sets being connected in parallel to the lower ends of the three transformer primary windings. The upper two sets are connected in parallel to taps on the three primary windings to reduce the step-down ratio of the transformer when these terminals are used. A movable insulating strip 13 carries three plugs 14 connected respectively to the 3-phase power supply through magnetic contactor 4. Strip 13 can be plugged in to any set of three jacks on the battery selector panel to adapt the circuit to the charging of any of the four types of batteries. When strip 13 is plugged into the jacks marked for charging 16-cell lead batteries (as shown), the strip engages the push buttons of a pair of switches 15 and 16 closing these switches.

Switch 15, when closed, connects the energizing circuit for timer control relay 6 through to the "back" contact of voltage relay 9. Switch 16, when closed, connects voltage relay 9 across the D. C. rectifier output circuit.

A second pair of push button switches 17 and 18 are similarly associated with the panel jacks marked for the 18-cell lead battery. Switch 17 has its contacts connected in parallel with the contacts of switch 15. Switch 18 has its contacts connected in parallel with the contacts of switch 16 through a resistance 19.

Assuming the circuit is set for charging a 16- cell lead battery as shown and the circuit is connected to a 3-phase A. C. source of suitable voltage, pilot light 20 will be energized from the A. C. line through thermal overload contacts 21 which are part of the magnetic contactor 4 and the winding 22 of the magnet of contactor 4. The current at this time is insufficient to operate the magnet.

If a finish rate period of 3½ hours is desired, time switch 5 is set for that period by rotating knob 23. This sets the timer arm for the desired period and closes contacts 24 which are controlled by the timer. Contacts 24 shunt lamp 20 and permit full energizing current to flow through magnet 22, thus operating it to close the circuit breaker contacts of magnetic contactor switch 4 and connect the 3-phase A. C. source to the transformer primary windings.

The output current from transformer 1 is rectified by rectifier 2 which may be formed of dry disc rectifiers such as the magnesium-copper sulfide type. The D. C. output of rectifier 2 is supplied as charging current to battery 10 through D. C. circuit 25. This circuit includes an ammeter 26 and a current-limiting resistance 27 and the contacts of finish rate relay 8 which are connected in parallel with a portion of resistance 27, and the contacts of relay 7 which are directly in series with the D. C. circuit.

As soon as D. C. current is supplied by rectifier 2, timer control relay 6 is energized over a circuit including the fixed portion of resistance 27, conductor 28, the winding of relay 6, contacts 15, the contacts of voltage relay 9 and back to the rectifier through the positive D. C. conductor. Timer control relay 6 immediately operates to open its contacts thus preventing operation of timer 5 during the initial charging period of the lead battery. Energizing current is also immediately supplied to relay 8 through conductor 28, the winding of relay 8, resistance 29, the contacts of voltage relay 9 and back through the positive conductor of the D. C. circuit. Relay 8, in operating, shunts out the major portion of resistance 27 to permit a high initial charging rate.

D. C. "off" relay 7 also immediately operates to connect the rectifier output to the battery. The energizing current for relay 7 is supplied through resistance 27, the winding of relay 7, resistance 30, contacts 31 of magnetic contactor 4 and back through the positive conductor of the D. C. circuit. Voltage relay 9 does not operate at this time, or operates only momentarily, since the battery voltage is low at the beginning of the charging period.

During charging pilot lamp 32 is energized indicating that charging is going on.

As the charge nears completion, the voltage of battery 10 increases to a value sufficient to operate marginal voltage relay 9. Relay 9, in operating, opens its contacts thus opening the energizing circuits for timer control relay 6 and finish rate relay 8. Relay 6 thereupon releases, closing its contacts to close the energizing circuit for timer 5 on single cycle A. C. current over a circuit extending through fuse 39, conductor 42, contacts 24 of timer 5, contacts of relay 6, timer motor 35, conductor 36 and contacts 37 of the magnetic contactor. The timer thereupon begins to rotate arm 38 toward contact arm 24a.

Operation of voltage relay 9 also de-energizes relay 8, which thereupon opens its contacts to remove the shunt around the major portion of resistance 27 and introduce the resistance into the charging circuit to lower the charging rate to the "finish rate."

The contacts of relay 9 are protected against arcing during operation by resistance 41 which absorbs part of the inductive surge of the coil circuit of relay 8.

When timer arm 38 reaches contact arm 24a, it opens the contacts 24 to open the energizing circuit for magnet 22 of magnetic contactor 4. Magnet 22 thereupon opens its contacts to disconnect the transformer from the A. C. supply. At the same time "charging" pilot lamp 32 is extinguished and "charge complete" pilot lamp 20 is again energized.

For charging an 18 cell lead battery, strip 13 is moved to the 18 cell position on the battery selector panel. The operation of the circuit is otherwise the same. Resistance 19 is inserted in series with voltage relay 9 on this setting due to the higher voltage of the battery to be charged. When strip 13 is plugged in to this position it will also be noted that the connections of the power conductors to the primary of transformer 1 are changed to decrease the step-down ratio of the transformer to accommodate the higher voltage battery to be charged.

For charging an Edison battery or nickel-iron battery, strip 13 is plugged into the position marked for 24 Edison or 30 cell Edison depending on the voltage of the battery to be charged. In these positions switches 15, 16, 17 and 18 all remain open. Voltage relay 9 therefore remains de-energized so that its contacts remain closed throughout the charging period. Timer control relay 6 also remains de-energized so that the timer circuit is closed throughout the charging period. The timer is set by rotating knob 23 to a position indicating the full charging period desired as indicated by the degree of charge of the battery at the beginning of the period. When the timer is set magnetic contactor 4 operates to connect the A. C. supply to the transformer. As soon as D. C. is supplied to the rectifier relay 8 operates to shunt out the major portion of resistance 27 and permit a high-charging rate. Relay 7 also operates to connect the D. C. supply to the battery. Timer 5 immediately starts to operate and measures the charging period at the end of which it opens contacts 24 as previously described to de-energize the magnetic contactor and disconnect the A. C. supply. Voltage relay 9 does not function during the charging of Edison type batteries.

To permit adjustment of the initial charging rate the primary windings of transformer 1 are provided with tap terminals 43 and a movable strip 44 is provided with three spaced plugs to effect a bridging connection between similar taps on the three windings.

While specific embodiments of the invention have been described, it is intended to cover the invention broadly within the spirit and scope of the appended claims.

What is claimed is:

1. A battery charging system for charging either lead or nickel-alkaline batteries, said system comprising an energy supply circuit having input conductors for connection to an A. C. source, a movable plug device having terminals connected to said input conductors, a plurality of socket positions each having a set of terminals for cooperation with said plug terminals, a transformer having its primary connected to said socket terminals, a rectifier fed by the secondary of said transformer and output conductors for connection to a battery to be charged fed by said rectifier, a circuit breaker having contacts in series with said input conductors, an electric timer and an energizing circuit therefor connected to said input conductors, said timer operating when electrically energized to measure a predetermined interval of time and then to open a pair of contacts at the end of the measured time interval, a magnet for closing and holding the contacts of said circuit breaker closed and an energizing circuit therefor including said timer contacts, a voltage operated relay connected across the output conductors and a timer control relay having an energizing circuit including the contacts of said voltage operated relay for opening said timer energizing circuit when the voltage across said output conductors is below the marginal operating voltage of said voltage relay and for closing said timer energizing circuit when the voltage across said output conductors exceeds said marginal voltage and switches in the energizing circuits of said voltage relay and timer control relay to remove control of said timer from said relays, the operating levers for said switches being disposed in certain of said socket positions for engagement by said plug device, whereby said switches are actuated by insertion of said plug device in said socket positions but not in the other socket positions not provided with said switches.

2. A battery charging system comprising an A. C. energy supply circuit, a rectifier fed by said circuit and a pair of D. C. output conductors fed by said rectifier for connection to a battery to be charged, an electric timer having an energizing circuit fed by said A. C. energy supply circuit and a pair of contacts controlled thereby, and a circuit breaker controlled by said timer and having contacts in series with said energy supply circuit, the energizing circuit for said circuit breaker extending from said A. C. source through said contacts controlled by said timer, and a relay having its contacts in series with one of said D. C. output conductors, the energizing circuit for said relay being connected across the output terminals of said rectifier and passing through contacts of said circuit breaker, whereby the rectifier will be disconnected from the battery being charged whenever said A. C. energy supply is opened by said circuit breaker.

ROBERT O. WHITESELL.